United States Patent
Tamai

(10) Patent No.: US 7,869,455 B2
(45) Date of Patent: Jan. 11, 2011

(54) CODE DIVISION MULTIPLEX TRANSMITTING AND RECEIVING APPARATUS AND METHOD

(75) Inventor: Hideaki Tamai, Kanagawa (JP)

(73) Assignee: Oki Electric Industry Co., Ltd., Tokyo (JP)

(*) Notice: Subject to any disclaimer, the term of this patent is extended or adjusted under 35 U.S.C. 154(b) by 191 days.

(21) Appl. No.: 12/222,902

(22) Filed: Aug. 19, 2008

(65) Prior Publication Data
US 2009/0103567 A1    Apr. 23, 2009

(30) Foreign Application Priority Data
Oct. 22, 2007    (JP)    ............ 2007-273502

(51) Int. Cl.
*H04B 7/216* (2006.01)
(52) U.S. Cl. ...................... 370/441; 375/343
(58) Field of Classification Search ........... 370/320, 370/342, 441, 479; 375/142, 150
See application file for complete search history.

(56) References Cited

U.S. PATENT DOCUMENTS

| | | | | |
|---|---|---|---|---|
| 5,159,611 | A * | 10/1992 | Tomita et al. | 375/254 |
| 5,416,787 | A * | 5/1995 | Kodama et al. | 714/790 |
| 5,550,809 | A * | 8/1996 | Bottomley et al. | 370/342 |
| 5,659,579 | A * | 8/1997 | Herzberg | 375/262 |
| 5,737,326 | A * | 4/1998 | I et al. | 370/335 |
| 5,920,552 | A * | 7/1999 | Allpress et al. | 370/335 |
| 5,923,701 | A * | 7/1999 | Nakamura | 375/142 |
| 6,041,074 | A * | 3/2000 | Nakamura | 375/142 |
| 6,205,169 | B1 * | 3/2001 | Nakamura | 375/152 |
| 6,272,123 | B1 * | 8/2001 | Abe | 370/342 |
| 6,829,742 | B1 * | 12/2004 | Jung et al. | 714/790 |
| 6,988,233 | B2 * | 1/2006 | Kanai et al. | 714/755 |
| 7,013,420 | B2 * | 3/2006 | Hofmann | 714/779 |

(Continued)

FOREIGN PATENT DOCUMENTS

| JP | 2003-317026 | 11/2003 |
|---|---|---|
| JP | 2004-080385 | 3/2004 |

OTHER PUBLICATIONS

Tamai et al., "Jisedai hikari akusesu shisutemu COF-PON no kenkyu kaihatsu" (Research and development of COF-PON: a next-generation optical access system), Oki Technical Review, Issue 210, vol. 74, No. 2, Apr. 2007.

(Continued)

*Primary Examiner*—Ricky Ngo
*Assistant Examiner*—Ben H Liu
(74) *Attorney, Agent, or Firm*—Rabin & Berdo, PC

(57) ABSTRACT

A code division multiplex transmitting and receiving apparatus has a transmitting apparatus with two coders per channel and terminal units with two matched filters each. One coder and one matched filter employ one spreading code; the other coder and the other matched filter employ another spreading code. The two coded signals output in parallel by the two coders are converted to a single serial signal before being multiplexed. The two matched filters sample alternate chips in the multiplexed signal. The two coders can be supplied with different data signals to double the transmission capacity, or with the same data signal to double the transmission distance. The outputs of the two matched filters are processed separately in the former case and are combined in the latter case.

22 Claims, 7 Drawing Sheets

U.S. PATENT DOCUMENTS

| | | | |
|---|---|---|---|
| 7,085,986 B2 * | 8/2006 | Nefedov | 714/755 |
| 7,124,344 B2 * | 10/2006 | Taira et al. | 714/755 |
| 7,289,459 B2 * | 10/2007 | Hayashi et al. | 370/320 |
| 2010/0054279 A1 * | 3/2010 | Feldbauer et al. | 370/475 |

OTHER PUBLICATIONS

Sasase, "Hiked shisutemu ni okeru hikari fugo bunkatsu tagen setsuzoku gijutsu" (Optical Code Division Multiple Access Techniques in Optical Communication Systems), TELECOMFRONTIER, Nov. 2004.

Kashima et al., "Ko-QoS maruchi media hikari haishin shisutemu no kenkyu kaihatsu—COF transhiba" (Research and development of high-QoS multimedia optical distribution system—COF transceiver), Oki Techhical Review, Issue 200, vol. 71, No. 4, Oct. 2004.

* cited by examiner

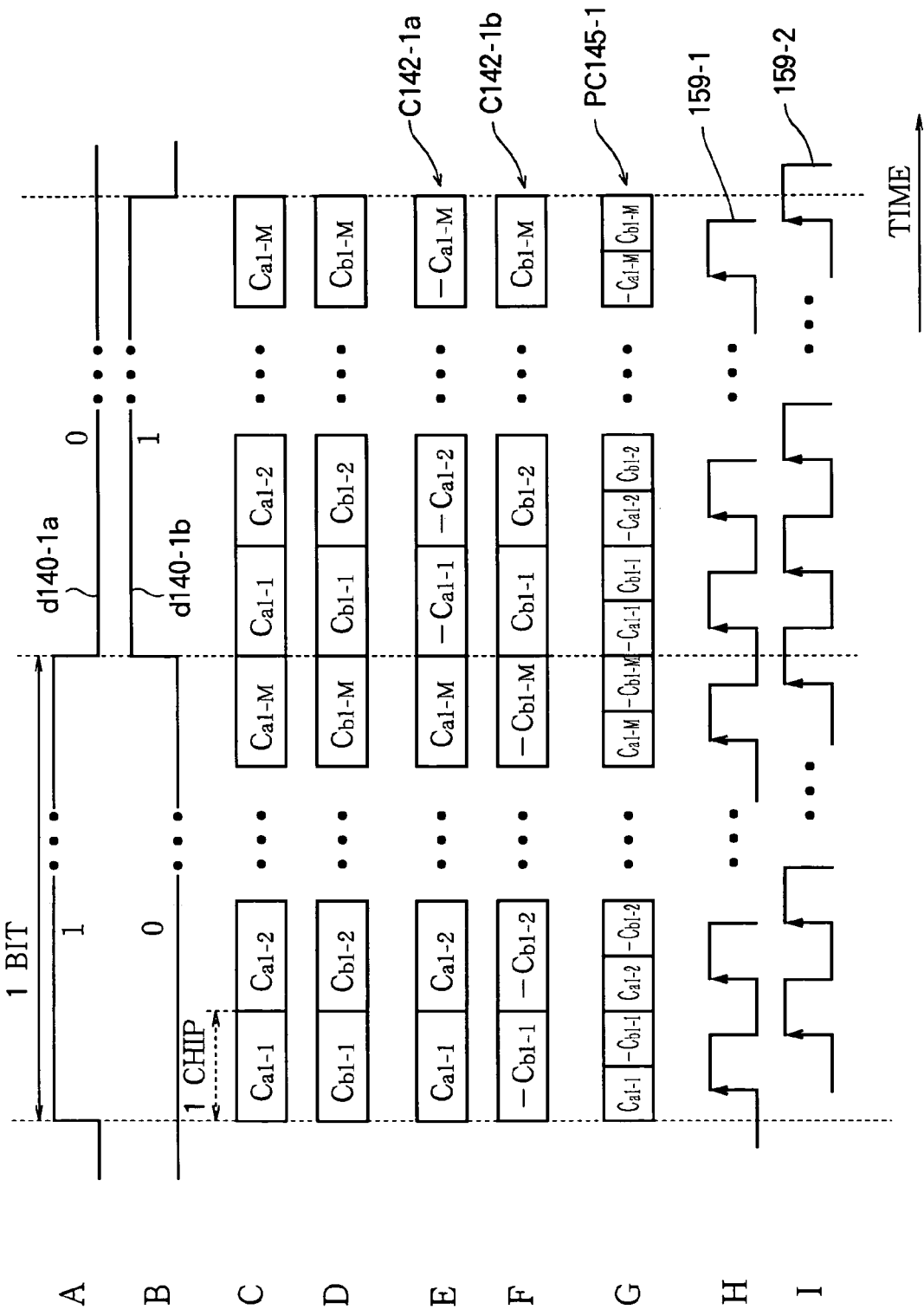

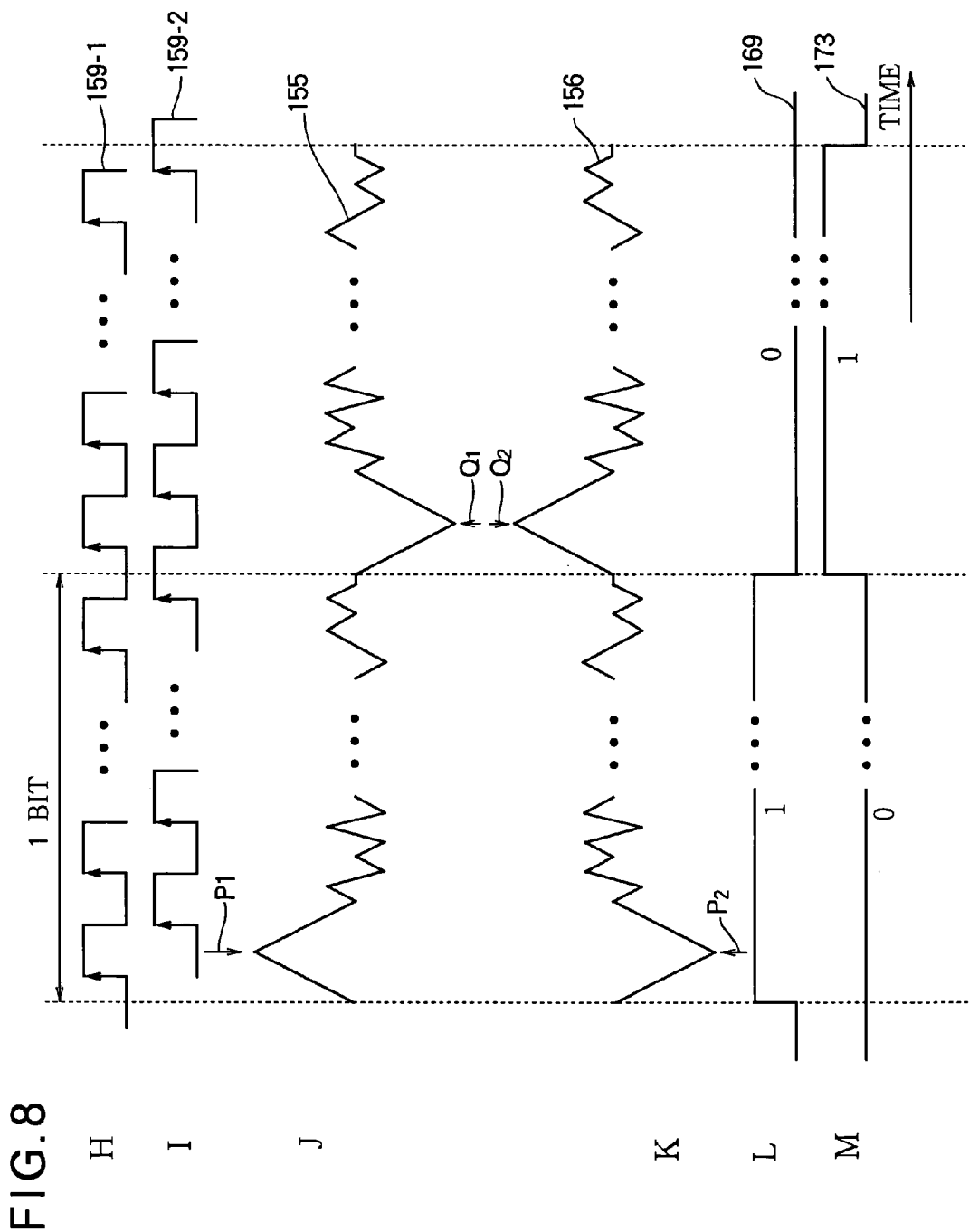

CODE DIVISION MULTIPLEX TRANSMITTING AND RECEIVING APPARATUS AND METHOD

BACKGROUND OF THE INVENTION

1. Field of the Invention

The present invention relates to a code division multiplex transmitting and receiving apparatus and a method of carrying out code division multiplexed communication between a central station and a plurality of receiving apparatuses.

2. Description of the Related Art

The following documents are referred to below.

Patent document 1: Matsuno et al., Japanese Patent No. 3913139, CDMA transmitter, CDMA multiplex transmitter, CDMA receiver, and CDMA communication system, pre-grant publication Mar. 11, 2004 as JP 2004-080385

Patent document 2: Sasaki et al., JP 2003-317026, Signed product sum computing element and analog matched filter including the same, published Nov. 7, 2003

Non-patent document 1: Tamai et al., 'Jisedai hikari akusesu shisutemu COF-PON no kenkyu kaihatsu' (Research and development of COF-PON: a next-generation optical access system), Oki Technical Review, Issue 210, Vol. 74, No. 2, April 2007

Non-patent document 2: Kashima et al., 'Ko-QoS maruchi media hikari haishin shisutemu no kenkyu kaihatsu—COF transhiba' (Research and development of high-QoS multimedia optical distribution system—COF transceiver) Oki Technical Review, Issue 200, Vol. 71, No. 4, October 2004

Non-patent document 3: Sasase, 'Hikari shisutemu ni okeru hikari fugo bunkatsu tagen setsuzoku gijutsu' (Optical Code Division Multiple Access Techniques in Optical Communication Systems) TELECOMFRONTIER, November 2004

Code division multiplexing (CDM) is currently employed in mobile access network systems, where it provides the capability to carry high volumes of communication traffic on multiple channels while conserving frequency and time-slot resources. Synchronous CDM systems in which each channel is separately synchronized have the particular advantage of providing stable extraction of an arbitrary channel from the multiplexed signal, as described by Matsuno et al. in the above patent document 1.

Passive optical network (PON) systems that use CDM for fiber-optic communication between a provider and stationary users are also attracting attention. Known as CDM-on-fiber-PON or COF-PON systems, these systems permit transmission over longer distances than are feasible in more traditional time division multiplex (TDM) optical access systems. COF-PON also has the advantage of being compatible with wavelength division multiplexing (WDM). COF-PON systems are described in non-patent documents 1-3 and patent document 2.

CDM transmitting and receiving apparatus is thus needed both for COF-PON and other optical access network systems, and for mobile communications. The present apparatus is concerned with apparatus for transmitting and receiving a CDM signal that is sent from the central station to a plurality of terminal units. The transmitting apparatus is often referred to as central office apparatus or optical line termination apparatus in optical access networks and as a base station apparatus in mobile communication systems. The terminal units may be referred to as optical network units in optical access systems, as mobile stations in mobile communication systems, and as subscriber apparatus in both types of systems.

In conventional CDM communication systems, typified by the system described by Matsuno et al. in patent document 1, the transmission rate per channel is fixed, and the maximum distance from the transmitting equipment to the receiving equipment is also fixed. These system parameters are related to the coding rate, that is, the number of chips into which each data bit is divided when transmitted, and the chip rate, that is, the number of chips transmitted per second. Modifying these parameters to accommodate a subscriber requiring a particularly high data rate or a subscriber located particularly far from the transmitting apparatus is not easy.

Accordingly, a conventional system must be designed to accommodate the needs of the most distant anticipated subscriber, and the subscriber with the highest anticipated transmission rate, even though most subscribers may have less demanding requirements. As a result, much of the capacity of the system becomes excess capacity that is not used. Furthermore, if an unanticipated new subscriber joins the system and the subscriber's communication needs exceed the system capabilities in terms of distance or transmission rate, the entire central office apparatus must be modified or replaced.

It would be preferable for the transmitting and receiving apparatus to more flexible, so that a long-distance or high-data-rate transmission capability could be provided for particular subscribers without being provided for all subscribers. A flexible system of this type would be far less expensive to operate than a conventional fixed-parameter system.

Diligent study of this problem by the present inventor has shown that a feasible solution is to generate two parallel data signals per channel, code them in parallel with different codes, convert the two coded signals to a single serial signal, and multiplex the serial signal.

SUMMARY OF THE INVENTION

An object of the present invention is to provide a flexible CDM transmitting and receiving apparatus that can accommodate both terminal units requiring comparatively low-data-rate transmission over comparatively long distances and terminal units requiring comparatively high-data-rate transmission over comparatively short distances with the same equipment configuration.

The invention provides a CDM transmitting and receiving apparatus including a transmitting apparatus and N terminal units connected to the transmitting apparatus through N respective communication channels, N being an integer greater than one.

For each communication channel, the transmitting apparatus has a pair of coders operating in parallel and employing different codes to code data to be transmitted on the channel, and a parallel-to-serial converter that converts the resulting pair of parallel coded signals to a single serial coded signal. A multiplexer in the transmitting apparatus multiplexes the N serial coded signals to generate a multiplexed signal which is transmitted to all N terminal units.

Each terminal unit correlates the multiplexed signal with two different codes, thereby obtaining a pair of parallel correlated signals representing-decoded data.

For channels requiring high-data-rate transmission, the pair of coders encode different data signals, thereby doubling the channel capacity. In this case, the receiving terminal unit may compare each correlated signal separately with a threshold to obtain a decoded data signal.

For channels requiring long-distance transmission, the pair of coders encode identical data signals. In this case, the receiving terminal unit may additively combine the two correlated signals and compare the combined signal with a threshold to obtain a decoded data signal, thereby doubling the coding gain.

Accordingly, when the transmitting apparatus transmits a multiplexed signal to a plurality of terminal units, it can accommodate distant terminal units by sending the same data to both coders, and can accommodate terminal units with heavy traffic loads by dividing the data among the two coders so that each coder codes only half of the data.

The invention also provides a method of transmitting data from a transmitting apparatus to a terminal unit. The method comprises:

using two coders operating in parallel with different codes to code the data;

converting the resulting pair of parallel coded signals to a serial coded signal;

transmitting the serial coded signal to the terminal unit as part of a multiplexed signal;

receiving the multiplexed signal at the terminal unit; and correlating the multiplexed signal in parallel with the different codes at the terminal unit to obtain a pair of correlated signals representing decoded data.

This method can also be used to transmit data from a transmitting apparatus to N terminal units, where N is an integer greater than one. The same multiplexed signal is sent to all N terminal units. Each terminal unit uses a different pair of codes to decode the multiplexed signal,

BRIEF DESCRIPTION OF THE DRAWINGS

In the attached drawings:

FIGS. 7 and 8 are timing diagrams illustrating the operation of the apparatus in FIGS. 5 and 6.

DETAILED DESCRIPTION OF THE INVENTION

Figure 1:
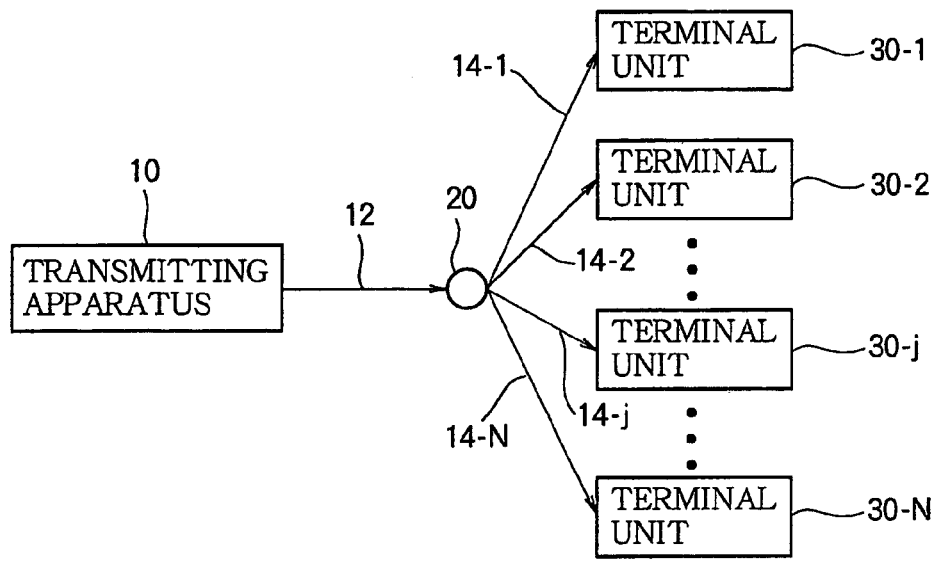
FIG. 1 is a schematic block diagram of a conventional CDM transmitting and receiving apparatus.

Embodiments of the invention will now be described with reference to the attached drawings, in which like elements are indicated by like reference characters. First, however, a general description of a conventional COF-PON system will be given.

Referring to FIG. 1, the conventional COF-PON system comprises a transmitting apparatus 10 connected through an optical fiber 12 to a passive optical coupler 20. The passive optical coupler 20 is connected by N branch optical fibers 14-1, 14-2, ..., 14-$j$, ..., 14-N to N terminal units 30-1, 30-2, ..., 30-$j$, ..., 30-N, where N is an integer greater than one and j is an arbitrary integer in the range from one to N.

Figure 2:
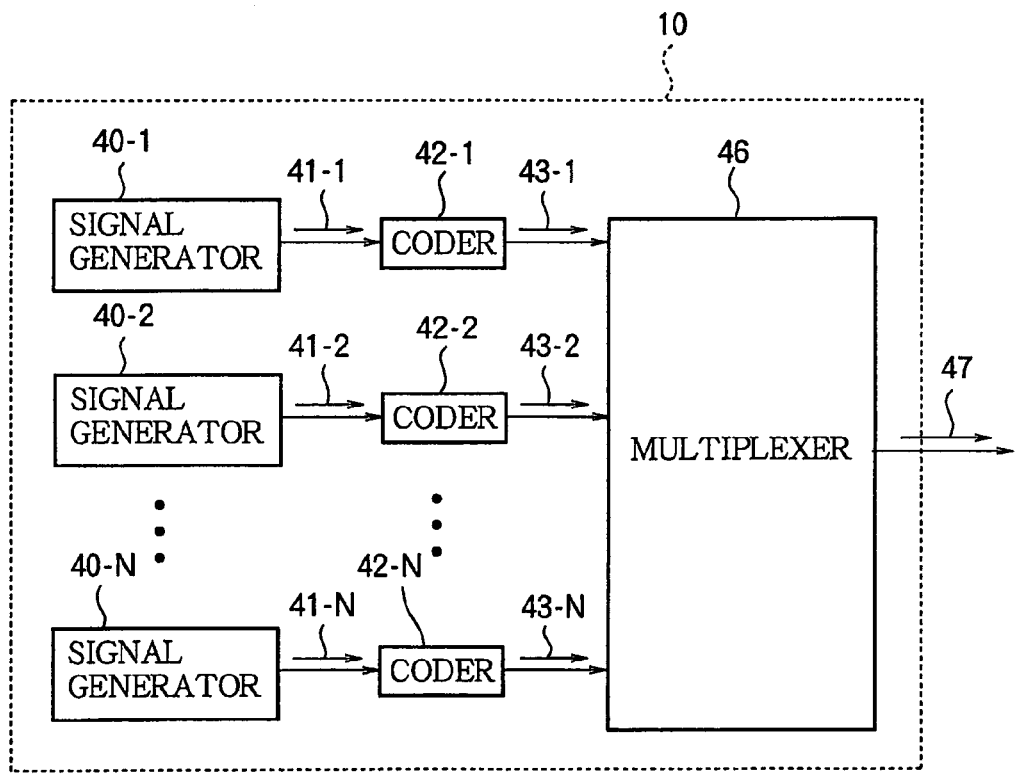
FIG. 2 is a more detailed block diagram of the transmitting apparatus in FIG. 1.

Referring to FIG. 2, the transmitting apparatus 10 comprises N signal generators 40-1, 40-2, ..., 40-N which output respective data signals 41-1, 41-2, ..., 41-N to respective coders 42-1, 42-2, ..., 42-N. The coders 42-1, 42-2, ..., 42-N code the data signals 41-1, 41-2, ..., 41-N by use of respective spreading codes. The coders 42-1, 42-2, ..., 42-N may use exclusive-OR logic gates to carry out the coding operations. Each coder has a different spreading code, but all of the spreading codes have the same length, and all of the coders 42-1, 42-2, ..., 42-N operate at the same speed. The resulting coded signals 43-1, 43-2, ..., 43-N are multiplexed by a multiplexer 46 and output as a CDM signal 47 on the optical fiber 12 in FIG. 1.

Figure 3:
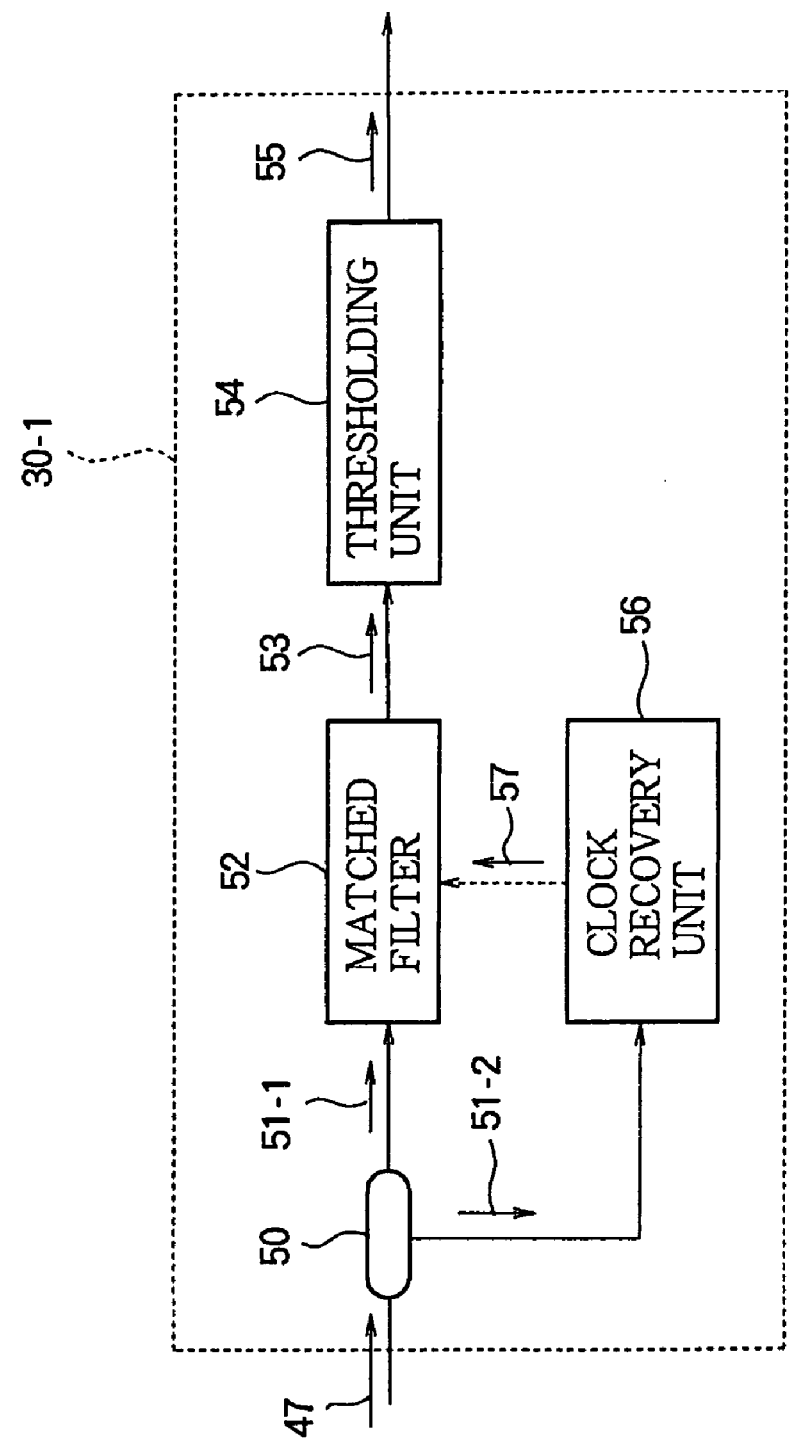
FIG. 3 is a more detailed block diagram of the receiving apparatus in FIG. 1.

The first terminal unit 30-1, shown in FIG. 3, comprises a splitter 50, a matched filter 52, a thresholding unit 54, and a clock recovery unit 56.

The splitter 50 splits the multiplexed signal or CDM signal 47, which is received on branch optical fiber 14-1 in FIG. 1, into two identical CDM signals 51-1, 51-2.

The clock recovery unit 56 extracts a clock signal 57 from CDM signal 51-2, and supplies the clock signal to the matched filter 52.

Operating in synchronization with the clock signal 57, the matched filter 52 correlates CDM signal 51-2 with the spreading code employed by coder 42-1 in the transmitting apparatus 10, and outputs a correlated signal 53.

The thresholding unit 54 compares the correlated signal 53 with a preset threshold value to generate a decoded signal 55.

The matched filter 52 may be an analog matched filter, in which case the thresholding unit 54 may be a well-known circuit comprising a comparator and a D-type flip-flop. Alternatively, the matched filter 52 may be a digital matched filter, in which case the functions of the thresholding unit 54 may be built into the matched filter 52, making the thresholding unit 54 unnecessary.

Each other terminal unit 30-$j$ (j=2, ..., N) has a similar internal structure, in which the matched filter 52 is adapted to correlate the CDM signal 47 with the spreading code employed by the coder 42-$j$ in the transmitting apparatus 10. The different spreading codes enable the CDM signal 47 to carry N multiplexed communication channels simultaneously. The term channel will also be used to denote the terminal unit 30-$j$, the corresponding signal generator 40-$j$ and coder 42-$j$ in the transmitting apparatus 10, and the signal paths interconnecting them.

Although the CDM signal 47 transmitted on the optical fiber 12 and branch optical fibers 14-1, ..., 14-N is an optical signal, the signal generators 40-1, ..., 40-N, coders 42-1, ..., 42-N, multiplexer 46, matched filter 52, thresholding unit 54, and clock recovery unit 56 may be electronic circuits if suitable electrical-to-optical and optical-to-electrical conversion elements (not shown) are provided.

The coding and correlation operations can be described as follows.

The spreading codes employed in the transmitting apparatus 10 are chip trains of length M ($C_1, C_2, ..., C_M$). Each chip has two possible signal levels, which may be denoted '1' and '0' or, more conveniently, '1' and '−1'.

For illustrative purposes, it will be assumed that there are only two channels (N=2), and spreading codes are of length four. The spreading code ($C_{1-1}, C_{1-2}, C_{1-3}, C_{1-4}$) used by coder 42-1, and by the matched filter 52 in first terminal unit 30-1, will be (1, 0, 0, 1), or (1, −1, −1, 1) in the more convenient algebraic notation. The spreading code ($C_{2-1}, C_{2-2}, C_{2-3}, C_{2-4}$) used by coder 42-2, and by the matched filter 52 in terminal unit 30-2, will be (1, 0, 1, 0), or (1, −1, 1, −1) in algebraic notation.

Suppose that the data to be transmitted on the first channel are (1, 0, 1 ...), or (1, −1, 1 ...). When the algebraic notation is used, the coding process can be described as a multiplication process in which each data bit is multiplied by all of the code chip values to produce a string of coded chips. For the first and third data bits, which have values of '1', the result is (1×1, 1×−1, 1×−1, 1×1)=(1, −1, −1, 1).

For the second data bit, which has a value of '−1', the result is (−1×1, −1×−1, −1×−1, −1×1)=(−1, 1, 1, −1).

The data signal (1, −1, 1, 1, . . . ) is accordingly coded to a coded signal 43-1 with the following chip values:

(1, −1, −1, 1, −1, 1, 1, −1, 1, −1, −1, 1, . . . )

Similarly if the data to be transmitted on the second channel are (1, 1, 0, . . . ), or (1, 1, −1, . . . ) in algebraic notation, the first and second data bits are coded to (1×1, 1×−1, 1×1, 1×−1)=(1, −1, 1, −1), the third data bit is coded to (−1×1, −1×−1, −1×1, −1×−1)=(−1, 1, −1, 1), and the coded signal 43-2 has the following chip values:

(1, −1, 1, −1, 1, −1, 1, −1, −1, 1, −1, 1, . . . )

The multiplexer 46 multiplexes the two coded signals 43-1, 43-2 by adding their values, obtaining (2, −2, 0, 0, 0, 0, 2, −2, 0, 0, −2, 2, . . . ).

When the first four chips of the CDM signal 47 have been received by the first terminal unit 30-1, the matched filter 52 correlates them with the spreading code (1, −1, −1, 1) by multiplying the received signal chips by the corresponding code chips and adding the sums, obtaining (2×1)+(−2×−1)+(0×−1)+(0×1)=4

When the eighth chip has been received, the correlated result is (0×1)+(0×−1)+(2×−1)+(−2×1)=−4.

When the twelfth chip has been received, the correlated result is (0×1)+(0×−1)+(−2×−1)+(2×1)=4

By comparing the correlated signal with a suitable threshold such as zero at these timings, outputting a result of '1' when the correlated value exceeds the threshold, and outputting a result of '0' when the correlated value is less than the threshold, the thresholding unit 54 recovers the transmitted data signal (1, 0, 1, . . . ).

In terminal unit 30-2, a similar correlation operation using the spreading code (1, −1, 1, −1) of the second channel yields correlated values of 4 at the fourth and eighth chips and −4 at the twelfth chip, causing the thresholding unit 54 in terminal unit 30-2 to reproduce the data (1, 1, 0, . . . ) which were transmitted on the second channel.

The reason for the reappearance of the transmitted data in the correlated output signal is as follows. In the general case of an apparatus with N channels, consider an instant at which data bits $D_1, D_2, D_3, \ldots$ coded by multiplication by respective code chips $C_1, C_2, C_3, \ldots$ used on the first, second, third, . . . channels arrive at the decoder. The chip received at this instant has the value $(D_1 \times C_1)+(D_2 \times C_2)+(D_3 \times C_3)+ \ldots$ When the analog matched filter in the first channel correlates the received signal with the spreading code, it multiplies this received chip value by the code value $C_1$, obtaining $(D_1 \times C_1 \times C_1)+(D_2 \times C_2 \times C_1)+(D_3 \times C_3 \times C_1)+ \ldots$ Regardless of whether $C_1$ is 1 or −1, the product $C_1 \times C_1$ is always 1, while the products $C_2 \times C_1$, $C_3 \times C_1$, and so on are 1 and −1 at random. In the correlation process, calculations such as the above are performed simultaneously for all chips in the spreading code, consistently obtaining $D_1$ but obtaining $D_2$ and $-D_2$, $D_3$ and $-D_3$ and so on about equally often. When the results of these simultaneous operations are added to obtain the correlated output, the value $D_1$ is reproduced with a gain equal to the code length while the other values $D_2$ and $-D_2$, $D_3$ and $-D_3$ and so on cancel out to zero, or approximately zero.

Figure 4:
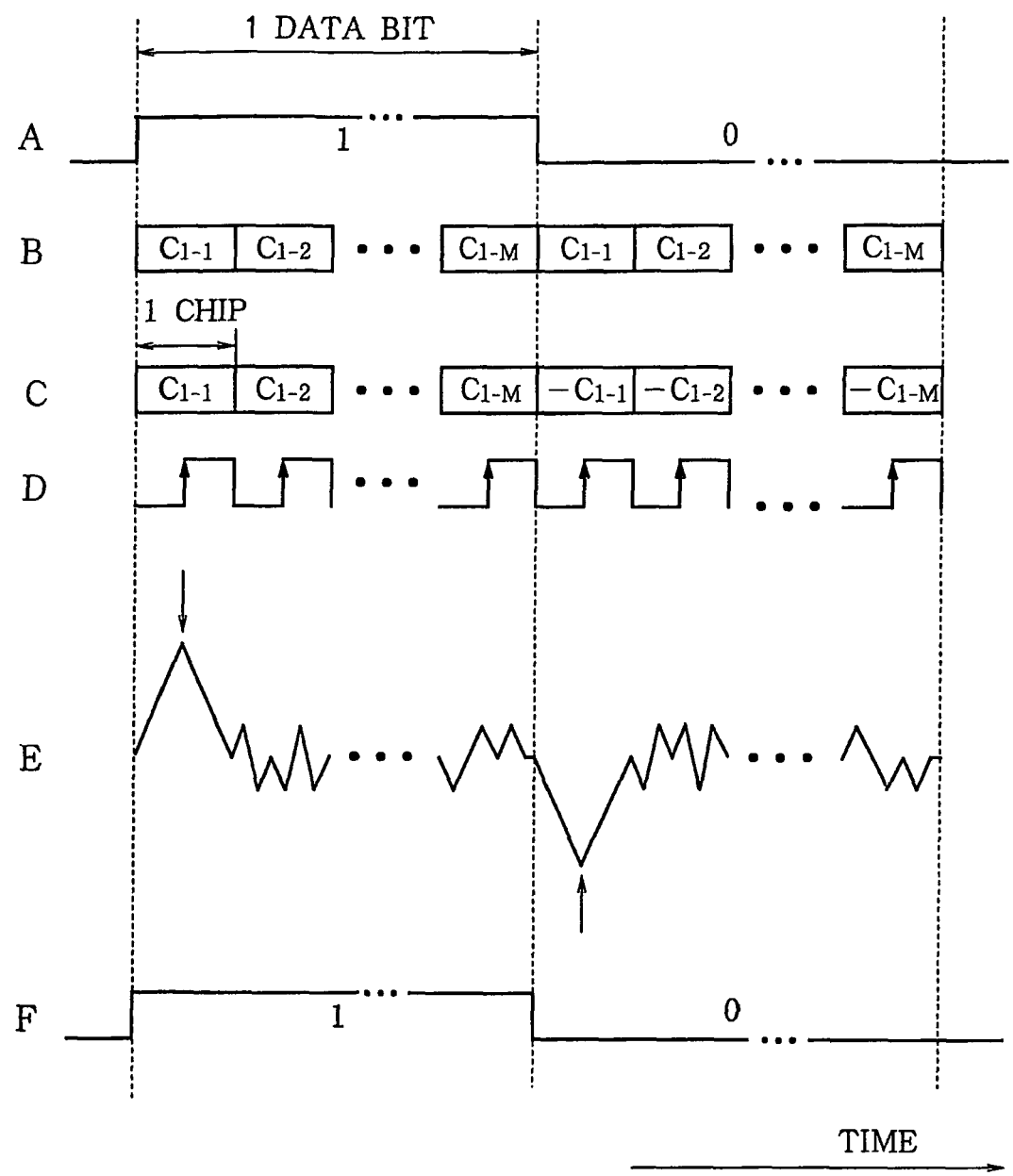
FIG. 4 is a timing diagram illustrating the operation of the CDM transmitting and receiving apparatus in FIG. 1.

The operation of the conventional CDM transmitting and receiving apparatus is summarized in FIG. 4. Waveform A illustrates two bits of an exemplary data signal (1, 0, . . . ) to be transmitted on, for example, the first channel, before coding by the M-chip spreading code ($C_{1-1}, C_{1-2}, \ldots, C_{1-M}$) of that channel (waveform B). The coding process converts the data signal to the chip train indicated as waveform C. At the first terminal unit 30-1, the chip train is sampled in synchronization with the clock signal (waveform D) output by the clock recovery unit 56, and the matched filter 52 correlates the samples with the spreading code. Waveform E schematically illustrates the correlated signal output by the matched filter 52. At every M-th clock pulse, the chip values of the spreading code match the values by which the signal was coded at the transmitting apparatus 10, and a positive or negative peak appears in the correlated signal, as indicated by the arrows. The thresholding unit 54, operating in synchronization with a bit-rate clock signal (not shown) compares the peak values with a threshold value, outputs a '1' when the peak value exceeds the threshold, outputs a '0' when the peak value is less than the threshold, and thereby recovers the transmitted data as illustrated in waveform F.

The non-peak parts of the correlated waveform are due to correlation of the spreading code with the data transmitted on all channels, at times at which the spreading code in the matched filter 52 is not aligned with the bit boundaries in the transmitted signal. At these times, the multiplication operations in the correlation process produce essentially random positive and negative results that, when added together, produce a value near zero.

The strength of the peaks in the correlated waveform F, that is, their amplitude in relation to the amplitude of the other parts of the waveform, depends on the code length M: longer spreading codes produces stronger peaks. The ratio of the peak amplitude to the amplitude of the individual chips before correlation is referred to as the coding gain.

The number of different channels that can be multiplexed into a single CDM signal of the above type depends on the code length M; longer codes permit more channels. The code length M is accordingly determined when the apparatus is designed. The same code length is used for all channels.

The data transmission rate is determined by the code length M and the frequency of the clock signal (waveform D) output by the clock recovery unit 56 in the terminal units. All terminal units must operate at the same clock frequency, so they all have the same data transmission rate.

The maximum distance over which data can be transmitted from the transmitting apparatus 10 to a terminal unit also depends on the code length M. A longer code produces a higher coding gain, making the received data detectable after transmission over a greater distance, despite the greater signal attenuation on the transmission path. Since the code length M is the same for all channels, the maximum transmission distance is the same for all channels.

When transmitting apparatus 10 has been installed, it may be initially connected to a limited number of terminal units, and further terminal units may be added later. The further terminal units cannot exceed the constraints on the data transmission rate and transmission distance imposed by the fixed code length M.

A transmitting and receiving apparatus embodying the present invention will now be described with reference to FIGS. 5 and 6. This apparatus may be employed in a COF-PON system of the type illustrated in FIG. 1, or in other data transmission systems, such as a system in which the transmitting apparatus is a base station transmitting wireless signals to N terminal units, where N is an integer greater than one.

Figure 5:
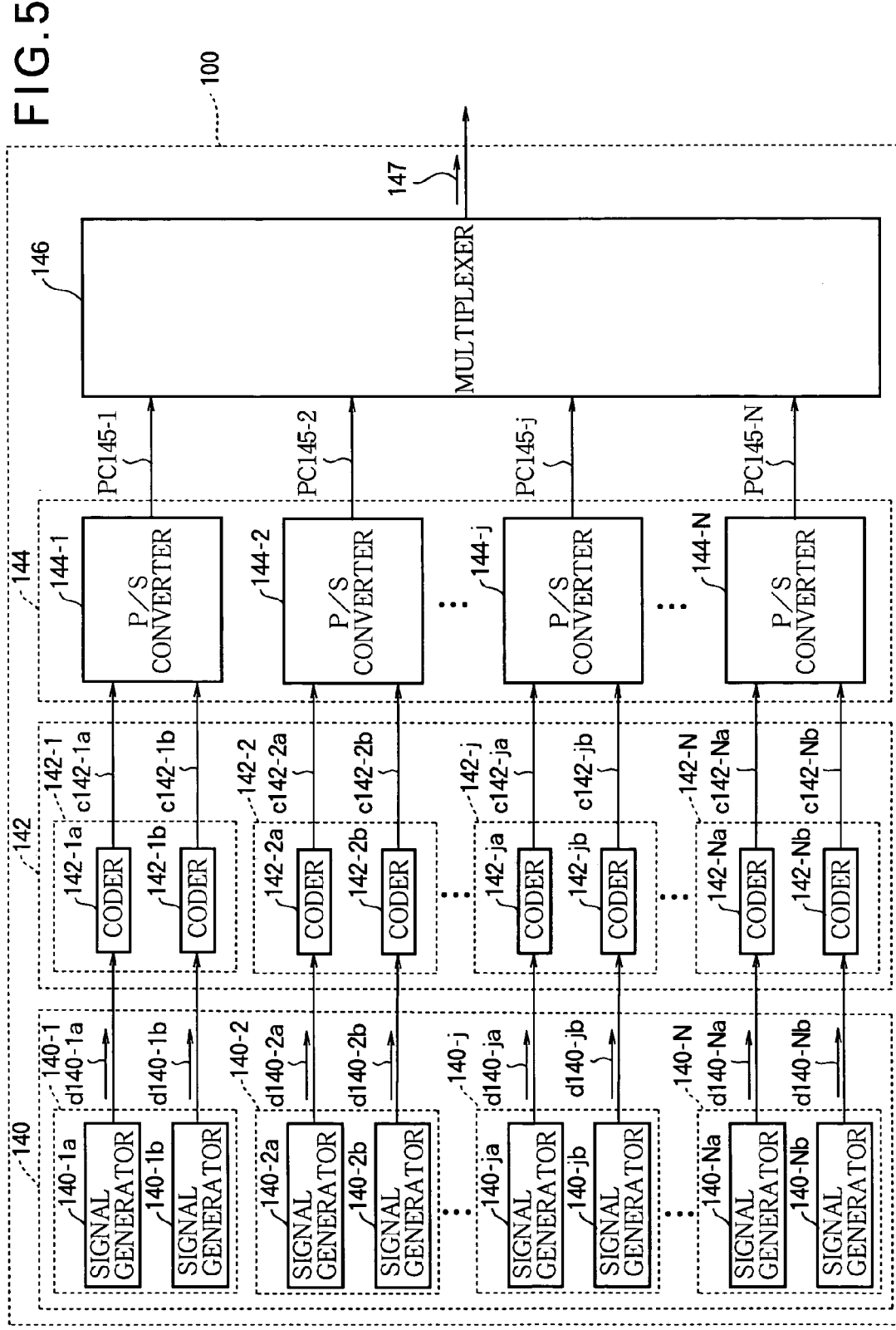
FIG. 5 is a schematic block diagram of a transmitting apparatus embodying the present invention.

Referring to FIG. 5, the transmitting apparatus comprises a signal generating module 140, a coding module 142, a parallel-to-serial (P/S) conversion module 144, and a multiplexer 146.

The signal generating module 140 comprises N signal generating units 140-1, 140-2, . . . , 140-j, . . . , 140-N including respective pairs of signal generators 140-1a, 140-1b, 140-2a, 140-2b, . . . , 140-ja, 140-jb, . . . , 140-Na, 140-Nb that output respective data signals d140-1a, d140-1b, d140-2a, d140-2b, . . . , d140-ja, d140-jb, . . . , d140-Na, d140-Nb. Each signal generating unit serves one communication channel.

The coding module 142 comprises N coding units 142-1, 142-2, . . . , 142-j, . . . , 142-N including respective pairs of coders 142-1a, 142-1b, 142-2a, 142-2b, . . . , 142-ja, 142-jb, . . . , 142-Na, 142-Nb that receive the data signals d142-1a, d142-1b, d142-2a, d142-2b, . . . , d142-ja, d142-jb, . . . , d142-Na, d142-Nb and output respective pairs of parallel coded signals c142-1a, c142-1b, c142-2a, c142-2b, . . . , c142-ja, c142-jb, . . . , c142-Na, c142-Nb. Each coding unit serves one communicational channel, so there are two coders per channel.

The parallel-to-serial conversion module 144 comprises N parallel-to-serial converters 144-1, 144-2, . . . , 144-j, . . . , 144-N. For each integer j from 1 to N, the j-th parallel-to-serial conversion module 144-j receives the pair of parallel coded signals c142-ja, c142-jb output from the j-th coding module 142-j and converts them to a single serial coded signal PC145-j. N serial coded signals PC145-1, PC145-2, . . . , PC145-N are thereby obtained.

The multiplexer 146 multiplexes the N serial coded signals PC145-1, . . . , PC145-N to generate a single CDM signal 147 for transmission to N terminal units.

Figure 6:
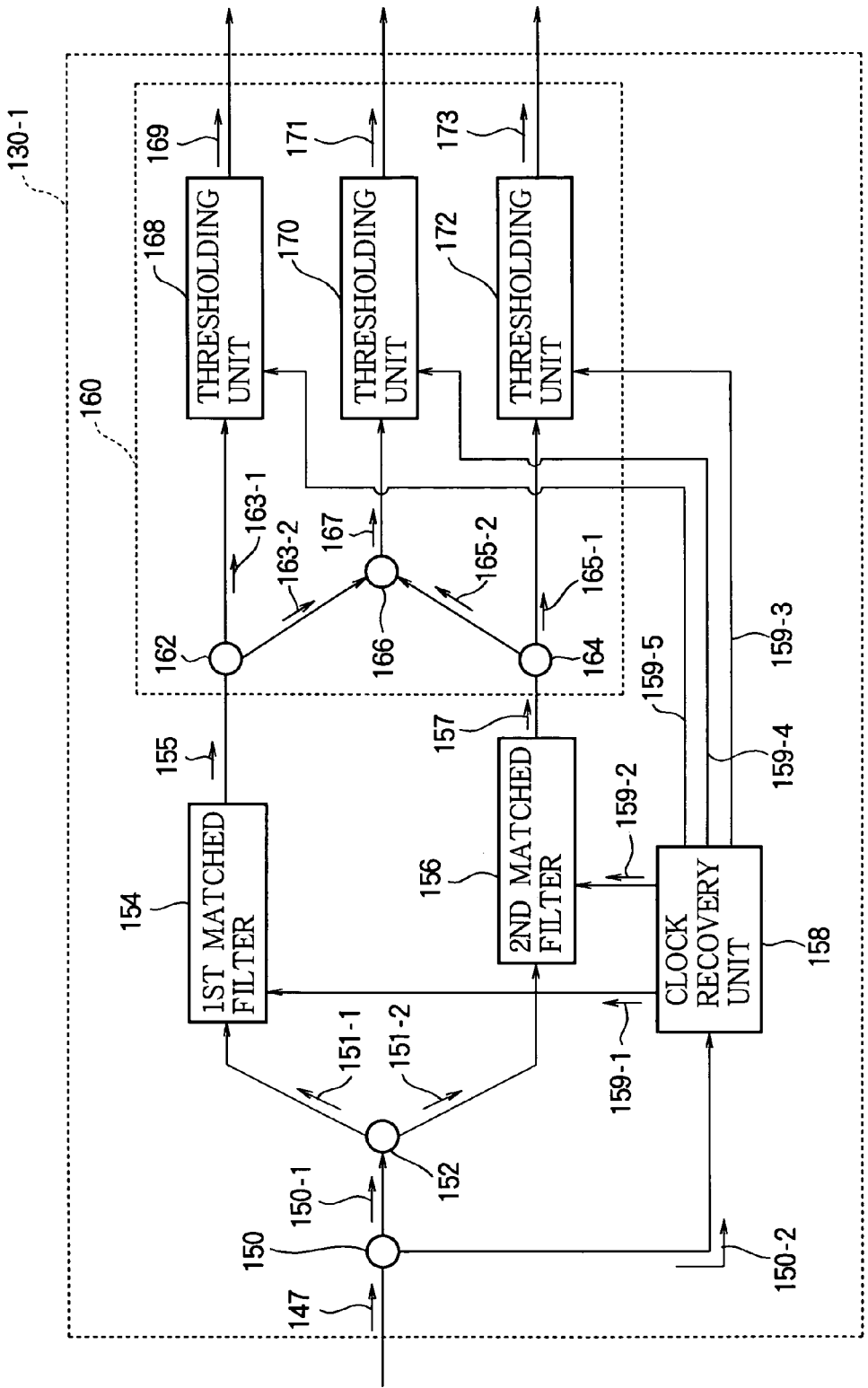
FIG. 6 is a schematic block diagram of a receiving apparatus embodying the invention.

Referring to FIG. 6, the first terminal unit 130-1 comprises a pair of splitters 150, 152, a first matched filter 154, a second matched filter 156, a clock recovery unit 158, and a received signal processing section 160. The received signal processing section 160 comprises a further pair of splitters 162, 164, an adder 166, and three thresholding units 168, 170, 172.

Splitter 150 splits the CDM signal 147 received from the transmitting apparatus 100 in FIG. 5 into two identical CDM signals 150-1, 150-2. Splitter 152 splits CDM signal 150-1 into two further identical CDM signals 151-1, 151-2.

The clock recovery unit 158 extracts a complementary pair of clock signals 159-1, 159-2 from CDM signal 150-2. 'Complementary' means that the two clock signals 159-1, 159-2 are mutually offset by one-half clock cycle, that is, by π radians in phase. These clock signals 159-1, 159-2 have a frequency equal to half the chip rate of the CDM signal 150-2.

The clock recovery unit 158 also generates clock signals 159-3, 159-4, 159-5 with frequencies equal to the bit rate of the CDM signal 150-2.

Operating in synchronization with clock signal 159-1, the first matched filter 154 correlates CDM signal 151-1 with the spreading code employed by coder 142-1a in the transmitting apparatus 100, and outputs a first correlated signal 155.

Operating in synchronization with clock signal 159-2, the second matched filter 156 correlates CDM signal 151-2 with the spreading code employed by coder 142-1b in the transmitting apparatus 100, and outputs a second correlated signal 157.

Splitter 162 splits the first correlated signal 155 into two identical first correlated signals 163-1, 163-2. Splitter 164 splits the second correlated signals 157 into two identical second correlated signals 165-1, 165-2. The adder 166 combines first correlated signal 163-2 and second correlated signal 165-2 by adding them together to produce a combined correlated signal 167.

Operating in synchronization with clock signal 159-5, the first thresholding unit 168 compares the first correlated signal 163-1 with a first threshold and generates a first received data signal 169.

Operating in synchronization with clock signal 159-3, the second thresholding unit 172 compares the second correlated signal 165-1 with a second threshold and generates a second received data signal 173.

Operating in synchronization with clock signal 159-4, the third thresholding unit 170 compares the combined correlated signal 167 with a third threshold and generates a third received data signal 171.

The first and second thresholds may be identical.

The thresholding units 168, 170, 172 may be adapted to output a value of '1' when the received signal exceeds the relevant threshold and a value of '0' when the received value is less than the threshold.

The other terminal units have similar internal structures, except that their matched filters are adapted to correlate the multiplexed signal with the spreading codes used by the other coders in the transmitting apparatus 100.

The matched filters 154, 156 in FIG. 6 are analog matched filters, but the invention may also be practiced with digital matched filters that output binary correlated signals that simply indicate the sign of the correlated result. These binary correlated signals may take values of '1' and '−1', for example, or '1' and '0'. If digital matched filters of this type are used, the thresholding units 168, 170, 172 may be omitted, or may be replaced by latch circuits that simply latch the correlated signals in synchronization with a bit clock signal. The adder 166 may be replaced with a logic gate such as an AND gate.

The transmitting apparatus 10 in FIG. 5 can operate in one of two selectable modes on each channel. In the first mode, the two signal generators of the signal generating unit of the channel generate different data signals. In the second mode, the two signal generators generate identical data signals.

The operation of the transmitting and receiving apparatus will now be described with reference to FIGS. 7 and 8, which illustrate the coding and decoding operations in the first channel. It will be assumed that the first channel operates in the first mode.

Waveform A in FIG. 7 shows exemplary data d140-1a (1, 0, . . . ) output by signal generator 140-1a. Waveform B shows exemplary data d140-1b (0, 1, . . . ) output by signal generator 140-1b. The output circuits of the signal generators 140-1a, 140-1b may be biased so that the actual output signal levels are a positive voltage and an equal but opposite negative voltage. The data signal levels will also be denoted '1' and '−1' instead of '1' and '0'.

In coding unit 142-1, coder 142-1a multiplies each bit of data signal d140-1a by a predetermined spreading code $(C_{a1-1}, C_{a1-2}, \ldots, C_{a1-M})$ of length M, indicated as waveform C, and coder 142-1b multiplies each bit of data signal d140-1b by a different spreading code $(C_{b1-1}, C_{b1-2}, \ldots, C_{b1-M})$ of the same length M, indicated as waveform D. Data signal d140-1a is thereby encoded to the coded signal c142-1a indicated as waveform E, while data signal d1401b is simultaneously encoded to the coded signal c142-1b indicated as waveform F. Parallel-to-serial converter 144-1 converts these two parallel coded signals c142-1a, c142-1b to a serial signal PC-145-1 in which the chips output by coder 142-1a are interleaved with the chips output by coder 142-1b, as indicated in waveform G.

In first terminal unit 130-1, the first matched filter 154 samples the CDM signal, which includes serial signal PC-145-1, in synchronization with clock signal 159-1, which has waveform H, thereby sampling the chips of coded signal c142-1a. The second matched filter 156 samples the CDM signal in synchronization with clock signal 159-1, which has waveform I, thereby sampling the chips of coded signal c142-1b. The clock recovery unit 158 adjusts the timing of clock signals 159-1 and 159-2 so that their sampling edges (the rising edges indicated by arrows in the drawing) are located within the relevant chip intervals in waveform G.

Clock waveforms H and I are reproduced in FIG. 8. The first matched filter 154, operating in synchronization with waveform H, generates a first correlated signal 155 having a positive peak $P_1$ followed at one bit interval by a negative peak $Q_1$, as shown in waveform J. The second matched filter 156, operating in synchronization with waveform I, generates a second correlated signals 157 having a negative peak $P_2$ followed at one bit interval by a positive peak $Q_2$, as shown in waveform K.

The first thresholding unit 168, operating in synchronization with clock signal 159-5 (not shown in FIG. 8), and compares the first correlated signal 163-1 (waveform J) with the first threshold to derive the first received data signal 169 (waveform L), which reproduces the data in data signal d140-1a. The second thresholding unit 172, operating in synchronization with clock signal 159-3 (not shown in FIG. 8), and compares the second correlated signal 165-1 (waveform K) with the second threshold to derive the second received data signal 173 (waveform M), which reproduces the data in data signal d140-1b.

The first terminal unit 130-1 processes both the first received data signal 169 (waveform L) and second received data signal 173 (waveform M) as received data, but does not use the third received data signal 171 output by the third thresholding unit 170.

Operating in the first mode, the first channel in the novel transmitting and receiving apparatus has the combined data transmission capacity of two channels in the conventional CDM transmitting and receiving apparatus, as can be seen by comparing FIGS. 7 and 8, in which four bits are transmitted and received on one channel, with FIG. 4, in which four bits are transmitted and received on two channels.

Operation in the second mode is the same as described above except that in the transmitting apparatus, the two signal generators 140-1a, 140-1b generate identical data signals, and in the terminal unit, the third received data signal 171 output by the third thresholding unit 170 is processed as received data.

Because the two signal generators 140-1a, 140-1b generate identical data signals, the two matched filters 154, 156 in the terminal unit generate identical correlated signals. The two correlated signals 163-2, 165-2 received by the adder 166 are accordingly identical. In the combined correlated signal 167 output by the adder 166, the peaks have absolute values twice as great as the peaks $P_1$, $Q_1$, $P_2$, $Q_2$ in waveforms J and K in FIG. 8.

The data can accordingly be received successfully even if the CDM signal 147 is attenuated during transmission by twice as much as in the first mode. Roughly speaking, this means that data can be transmitted twice as far in the second mode as in the first mode. The data transmission rate is the same as in the conventional CDM transmitting and receiving apparatus.

The first and second received data signals 169, 173 output by the first and second thresholding units 168, 172 are not used in the second mode.

In a COF-PON system, the novel transmitting and receiving apparatus described above provides the capability to accommodate both nearby terminal units requiring high data transmission rates and distant terminal units not requiring such high data transmission rates.

The invention is not limited to the embodiment described above. In one variation of this embodiment, the first correlated signal 155, the second correlated signal 157, or the combined correlated signal 167 is supplied to the clock recovery unit 158 for use in generating the clock signals 159-3, 159-4, 159-5 supplied to the thresholding units.

In another variation, a delay circuit is added to delay the first correlated signal 155 output from the first matched filter 154 by one chip period, to align the peaks in the first correlated signal 155 with the peaks in the second correlated signals 157 output from the second matched filter 156.

In still another variation, the CDM signal 151-1 input to the first matched filter 154 is delayed by one chip period for the same purpose. In this case, the same clock signal may be supplied to both matched filters 154, 156.

In yet another variation, splitters 162, 164, the adder 166, and the third thresholding unit 170 are omitted in terminal units operating in the first mode, and splitters 162, 164, the first thresholding unit 168, and the second thresholding unit 172 are omitted in terminal units operating in the second mode.

In a further variation, the transmitting apparatus also includes channels having only a single signal generator, a single coder, and no parallel-to-serial converter. In these channels, the coded signal is input directly to the multiplexer. These channels can be used for terminal units that are located comparatively nearby and do not require a high data transmission rate.

Those skilled in the art will recognize that further variations are possible within the scope of the invention, which is defined in the appended claims.

What is claimed is:

1. A code division multiplex (CDM) transmitting and receiving apparatus comprising a transmitting apparatus and N terminal units connected to the transmitting apparatus through N respective communication channels, N being an integer greater than one, wherein:

for each one of the N communication channels, the transmitting apparatus has a pair of coders, operating in parallel and employing different spreading codes, for coding data to be transmitted on the one of the N communication channels to generate a pair of parallel coded signals, and a parallel-to-serial converter for converting the pair of parallel coded signals to a single serial coded signal, whereby for the N channels, N serial coded signals are obtained;

the transmitting apparatus also has a multiplexer for multiplexing the N serial coded signals to generate a multiplexed signal and transmitting the multiplexed signal to the N terminal units; and each terminal unit among the N terminal units correlates the multiplexed signal with two different spreading codes, thereby obtaining a pair of parallel correlated signals representing decoded data, wherein the pair of coders for the j-th communication channel (j being an integer equal to any of 1 to N) operate in a first mode in which they code different data signals, or in a second mode in which they code identical data signals; and when the pair of coders for the j-th communication channel operate in the first mode, the terminal unit connected to the transmitting apparatus through the j-th communication channel processes, as received data, first and second decoded data signals respectively corresponding to the pair of parallel correlated signals; and when the pair of coders for the j-th communication channel operate in the second mode, the terminal unit connected to the transmitting apparatus through the j-th communication channel processes, as the received data, a third decoded data signal corresponding to an additive combination of the pair of parallel correlated signals.

2. The CDM transmitting and receiving apparatus of claim 1, wherein each terminal unit comprises:
a first matched filter for correlating the multiplexed signal with one of the different spreading codes and outputting a first correlated signal as one of the pair of parallel correlated signals; and
a second matched filter for correlating the multiplexed signal with another one of the different spreading codes and outputting a second correlated signal as another one of the pair of parallel correlated signals.

3. The CDM transmitting and receiving apparatus of claim 2, wherein each terminal unit further comprises a clock recovery unit for recovering clock signals from the multiplexed signal and supplying the clock signals to the first matched filter and the second matched filter.

4. The CDM transmitting and receiving apparatus of claim 2, wherein each terminal unit further comprises:
a first thresholding unit for comparing the first correlated signal with a first threshold value and outputting the first decoded data signal; and
a second thresholding unit for comparing the second correlated signal with a second threshold value and outputting the second decoded data signal.

5. The CDM transmitting and receiving apparatus of claim 2, wherein each terminal unit further comprises:
an adder for additively combining the first correlated signal and the second correlated signal to produce a combined correlated signal; and
a thresholding unit for comparing the combined correlated signal with a threshold value and outputting the third decoded data signal.

6. The CDM transmitting and receiving apparatus of claim 2, wherein each terminal unit further comprises:
a first thresholding unit for comparing the first correlated signal with a first threshold value and outputting the first decoded data signal;
a second thresholding unit for comparing the second correlated signal with a second threshold value and outputting the second decoded data signal;

an adder for additively combining the first correlated signal and the second correlated signal to produce a combined correlated signal; and
a third thresholding unit for comparing the combined correlated signal with a threshold value and outputting the third decoded data signal.

7. A method of transmitting data from a transmitting apparatus to a terminal unit connected to the transmitting apparatus through a communication channel, comprising:
using two coders operating in parallel with different spreading codes to code the data to be transmitted, thereby generating a pair of parallel coded signals;
converting the pair of parallel coded signals to a serial coded signal;
transmitting the serial coded signal to the terminal unit as part of a multiplexed signal;
receiving the multiplexed signal at the terminal unit; and
correlating the multiplexed signal in parallel with the different spreading codes, thereby obtaining a pair of parallel correlated signals representing decoded data, wherein
the coding by the two coders is performed in a first mode in which different data signals are coded, or in a second mode in which identical data signals are coded; and
when the coding is performed in the first mode, first and second decoded data signals respectively corresponding to the pair of parallel correlated signals are processed as received data; and
when the coding is performed in the second mode, a third decoded data signal corresponding to an additive combination of the pair of parallel correlated signals is processed as the received data.

8. The method of claim 7, wherein correlating the multiplexed signal comprises:
using a first matched filter to correlate the multiplexed signal with one of the different spreading codes and outputting a first correlated signal as one of the pair of parallel correlated signals; and
using a second matched filter to correlate the multiplexed signal with another one of the different spreading codes and outputting a second correlated signal as another one of the pair of parallel correlated signals.

9. The method of claim 8, further comprising recovering clock signals from the multiplexed signal at the terminal unit and supplying the clock signals to the first matched filter and the second matched filter.

10. The method of claim 8, further comprising:
comparing the first correlated signal with a first threshold value to generate the first decoded data signal; and
comparing the second correlated signal with a second threshold value to generate the second decoded data signal.

11. The method of claim 8, further comprising:
additively combining the first correlated signal and the second correlated signal to produce a combined correlated signal; and
comparing the combined correlated signal with a threshold value to generate the third decoded data signal.

12. The method of claim 8, further comprising:
comparing the first correlated signal with a first threshold value to generate the first decoded data signal;
comparing the second correlated signal with a second threshold value to generate the second decoded data signal;
combining the first correlated signal and the second correlated signal to produce a combined correlated signal; and comparing the combined correlated signal with a threshold value to generate the third decoded data signal.

13. A method of transmitting data from a transmitting apparatus to N terminal units connected to the transmitting apparatus through N respective communication channels, N being an integer greater than one, comprising:

using two coders per communication channel, the two coders operating in parallel with different spreading codes, to code the data to be transmitted to each one of the N terminal units, thereby generating N pairs of parallel coded signals;

converting each one of the N pairs of parallel coded signals to a serial coded signal, thereby obtaining N serial coded signals;

multiplexing the N serial coded signals to obtain a multiplexed signal;

transmitting the multiplexed signal to all N of the terminal units;

receiving the multiplexed signal at each one of the N terminal units; and correlating the multiplexed signal in parallel with two different spreading codes at each one of the N terminal units, thereby obtaining a pair of parallel correlated signals representing decoded data at each one of the N terminal units, wherein the coding by the two coders for the j-th communication channel (j being an integer equal to any of 1 to N) is performed in a first mode in which different data signals are coded, or in a second mode in which identical data signals are coded; and when the coding by the two coders for the j-th communication channel is performed in the first mode, first and second decoded data signals respectively corresponding to the pair of parallel correlated signals are processed as received data at the terminal unit connected to the transmitting apparatus through the j-th communication channel; and when the coding by the two coders for the j-th communication channel is performed in the second mode, a third decoded data signal corresponding to an additive combination of the pair of parallel correlated signals is processed as the received data at the terminal unit connected to the transmitting apparatus through the j-th communication channel.

14. The CDM transmitting and receiving apparatus of claim 1, wherein the pair of coders for the j-th communication channel code the data to be transmitted with first and second spreading codes different from each other, and the terminal unit connected to the transmitting apparatus through the j-th communication channel correlates the multiplexed signal with said first and second spreading codes.

15. The CDM transmitting and receiving apparatus of claim 14, wherein said first and second spreading codes are of the same length.

16. The CDM transmitting and receiving apparatus of claim 14, wherein each of said pair of parallel coded signals consists of a train of chips, and the serial coded signal consists of a train of chips in which all the chips of one of said pair of parallel coded signals are interleaved with all the chips of the other of said pair of parallel coded signals.

17. The method of claim 7, wherein the coding by the two coders is performed using first and second spreading codes different from each other, and the correlation is performed using said first and second spreading codes.

18. The method of claim 17, wherein said first and second spreading codes are of the same length.

19. The method of claim of claim 17, wherein each of said pair of parallel coded signals consists of a train of chips, and the serial coded signal consists of a train of chips in which all the chips of one of said pair of parallel coded signals are interleaved with all the chips of the other of said pair of parallel coded signals.

20. The method of claim 13, wherein the coding by the two coders for the j-th communication channel is performed using first and second spreading codes different from each other, and the correlation at the terminal unit connected to the transmitting apparatus through the j-th communication channel is performed using said first and second spreading codes.

21. The method of claim 20, wherein said first and second spreading codes are of the same length.

22. The method of claim of claim 20, wherein each of j-th pair of parallel coded signals consists of a train of chips, and the j-th serial coded signal consists of a train of chips in which all the chips of one of said j-th pair of parallel coded signals are interleaved with all the chips of the other of said j-th pair of parallel coded signals.

* * * * *